US012704847B2

(12) United States Patent
McCabe et al.

(10) Patent No.: US 12,704,847 B2
(45) Date of Patent: Aug. 11, 2026

(54) SYSTEMS AND METHODS FOR DETERMINING EMERGENCY ESCAPE PATHS FOR AIRCRAFT

(71) Applicant: THE BOEING COMPANY, Arlington, VA (US)

(72) Inventors: Mark David McCabe, Larkspur, CO (US); Alexander Bellemare-Davis, Vancouver BC (CA); Meng Xi Hu, Vancouver BC (CA); Yun Chu, New Westminster BC (CA); Tina Pan, Vancouver BC (CA)

(73) Assignee: The Boeing Company, Arlington, VA (US)

( * ) Notice: Subject to any disclaimer, the term of this patent is extended or adjusted under 35 U.S.C. 154(b) by 220 days.

(21) Appl. No.: 18/340,181

(22) Filed: Jun. 23, 2023

(65) Prior Publication Data

US 2024/0427336 A1 Dec. 26, 2024

(51) Int. Cl.

| | |
|---|---|
| ***G05D 1/00*** | (2024.01) |
| ***G08G 5/21*** | (2025.01) |
| ***G08G 5/34*** | (2025.01) |
| ***G08G 5/55*** | (2025.01) |
| ***G08G 5/58*** | (2025.01) |
| ***G08G 5/74*** | (2025.01) |
| ***G08G 5/76*** | (2025.01) |

(52) U.S. Cl.

CPC ......... *G05D 1/0688* (2019.05); *G05D 1/0088* (2013.01); *G08G 5/21* (2025.01); *G08G 5/34* (2025.01); *G08G 5/74* (2025.01); *G08G 5/76* (2025.01); *G08G 5/55* (2025.01); *G08G 5/58* (2025.01)

(58) Field of Classification Search

CPC ...... G05D 1/0688; G05D 1/0088; G08G 5/21; G08G 5/34; G08G 5/74; G08G 5/76; G08G 5/55; G08G 5/58

USPC .......................................................... 701/3

See application file for complete search history.

(56) References Cited

U.S. PATENT DOCUMENTS 7,792,615 B2 * 9/2010 Aimar .................. G05D 1/0688 701/4
8,135,500 B1 * 3/2012 Robinson ................ G08G 5/26 701/14
11,551,564 B2 * 1/2023 Suiter .................... B64D 45/08
(Continued)

FOREIGN PATENT DOCUMENTS

WO WO 2008/130453 10/2008

OTHER PUBLICATIONS

Extended European Search Report for EP 24181386.4-1009, dated Oct. 14, 2024.

*Primary Examiner* — Krishnan Ramesh
(74) *Attorney, Agent, or Firm* — Joseph M. Butscher; Carroll, Hoette & Butscher, LLC

(57) ABSTRACT

A system (for determining one or more emergency escape paths for one or more emergencies that can occur during a flight of an aircraft) includes a control unit configured to automatically determine the one or more emergency escape paths for the one or more emergencies based on performance capabilities of the aircraft, terrain within at least a portion of an original flight path or the one or more emergency escape paths, and obstacles within at least a portion of the original flight path or the one or more emergency escape paths.

20 Claims, 4 Drawing Sheets

(56) References Cited

U.S. PATENT DOCUMENTS

| | | | | |
|---|---|---|---|---|
| 11,657,721 | B1 * | 5/2023 | Suiter | G08G 5/34 701/14 |
| 11,679,874 | B2 * | 6/2023 | Yuksel | H02P 5/46 701/3 |
| 12,260,769 | B1 * | 3/2025 | Suiter | G08G 5/30 |
| 2005/0267651 | A1 * | 12/2005 | Arango | G08G 1/205 701/3 |
| 2007/0129855 | A1 * | 6/2007 | Coulmeau | G08G 5/58 701/3 |
| 2008/0154447 | A1 * | 6/2008 | Spinelli | G05D 1/105 701/16 |
| 2016/0232795 | A1 * | 8/2016 | Thiele | G08G 5/55 |
| 2018/0118371 | A1 * | 5/2018 | Rudich | B64D 45/0034 |
| 2019/0011920 | A1 * | 1/2019 | Heinonen | G05D 1/0094 |
| 2020/0327814 | A1 * | 10/2020 | Adolf | G05D 1/102 |
| 2020/0331590 | A1 * | 10/2020 | Yuksel | B64U 30/20 |
| 2021/0358312 | A1 * | 11/2021 | Shu-Zhong Cabos | G08G 5/74 |
| 2022/0028285 | A1 * | 1/2022 | Raynaud | G08G 5/54 |
| 2022/0204180 | A1 * | 6/2022 | Sellmann | G01C 23/005 |
| 2022/0284823 | A1 * | 9/2022 | Navarro Félix | G06Q 10/063 |
| 2024/0144834 | A1 * | 5/2024 | Ortlieb | G08G 5/74 |

* cited by examiner

132

150 152

SYSTEMS AND METHODS FOR DETERMINING EMERGENCY ESCAPE PATHS FOR AIRCRAFT

FIELD OF THE DISCLOSURE

Examples of the present disclosure generally relate to systems and methods for determining emergency escape paths for aircraft.

BACKGROUND OF THE DISCLOSURE

Aircraft are used to transport passengers and cargo between various locations. Numerous aircraft depart from and arrive at a typical airport every day.

An emergency escape path is a flight path that an aircraft takes in order to execute an emergency procedure. During different stages of flight, various different types of emergencies can occur. As an example, an aircraft may experience an engine failure. In response, the pilot can stop the aircraft before take-off, or if it is too late to do so, fly along an emergency escape path that allows the aircraft to fly out and avoid obstacles and terrain before returning to the departure airport, or another airport. As another example, in the case of a decompression emergency, a flight crew has approximately ten minutes to descend an aircraft below 10,000 feet in altitude. However, at certain locations, there may be terrain that exceeds 10,000 feet. In this case, the emergency escape path avoids such terrain.

Aircraft operators are required to plan a safe path for each flight. These requirements are described in regulatory documents overseen by such bodies as the United States Federal Aviation Administration (FAA). An example of such a regulatory document is the FAA's United States Standard for Terminal Instrument Procedures and FAA Advisory Circular 120-91A. An aircraft operator may manage additional business and safety policies, including the determination of maximum allowable takeoff weight. Notably, an important recurring principle in the guidance stipulates that a flight must be able to safely takeoff and navigate clear of obstructions (or otherwise safely abort) in the event of an emergency, such as a single engine failure, at any time during a takeoff. Similar flight plan requirements apply for minimum clearance margins in other flight segments, including landing, one-engine inoperative cruise, and emergency descent. Designing emergency escape paths which meet all such clearance margin requirements is time-consuming and labor-intensive.

Currently, emergency takeoff and descent procedures are manually generated by highly specialized analysts. Emergency escape paths and a maximum legal takeoff weight are generally determined by human experts. As can be appreciated, the process of manually determining emergency escape paths for various types of flight emergencies is time and labor intensive.

SUMMARY OF THE DISCLOSURE

A need exists for a system and a method for efficiently and effectively determining emergency escape paths for various different types of flight emergencies, such as engine failures, decompression emergencies, and the like.

With that need in mind, certain examples of the present disclosure provide a system for determining one or more emergency escape paths for one or more emergencies that can occur during a flight of an aircraft. The system includes a control unit configured to automatically determine the one or more emergency escape paths for the one or more emergencies based on performance capabilities of the aircraft, terrain within at least a portion of an original flight path or the one or more emergency escape paths, and obstacles within at least a portion of the original flight path or the one or more emergency escape paths.

In at least one example, the control unit is configured to automatically determine the one or more emergency escape paths based further on one or more airports, one or more flights of the aircraft, and/or weather.

The emergencies can include an engine failure, an unsafe decompression, and/or the like.

The system can also include a user interface in communication with the control unit. The user interface includes a display. The control unit is configured to show the one or more emergency escape paths on the display.

In at least one example, the control unit is configured to automatically determine the one or more emergency escape paths before the aircraft is dispatched for a flight.

In at least one example, the control unit is configured to automatically determine the one or more emergence escape paths in response to receiving an emergency signal indicating the one or more emergencies from the aircraft during a flight.

The emergencies can include all types of emergencies that can occur during the flight.

The aircraft can be automatically operated according to the one or more emergency escape paths.

The control unit can be an artificial intelligence or machine learning system.

Certain examples of the present disclosure provide a method for determining one or more emergency escape paths for one or more emergencies that can occur during a flight of an aircraft, the method comprising: automatically determining, by a control unit, the one or more emergency escape paths for the one or more emergencies based on performance capabilities of the aircraft, terrain within at least a portion of an original flight path or the one or more emergency escape paths, and obstacles within at least a portion of the original flight path or the one or more emergency escape paths.

Certain examples of the present disclosure provide a non-transitory computer-readable storage medium comprising executable instructions that, in response to execution, cause one or more control units comprising a processor, to perform operations comprising: automatically determining one or more emergency escape paths for one or more emergencies based on performance capabilities of an aircraft, terrain within at least a portion of an original flight path or the one or more emergency escape paths, and obstacles within at least a portion of the original flight path or the one or more emergency escape paths.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Figure 1:
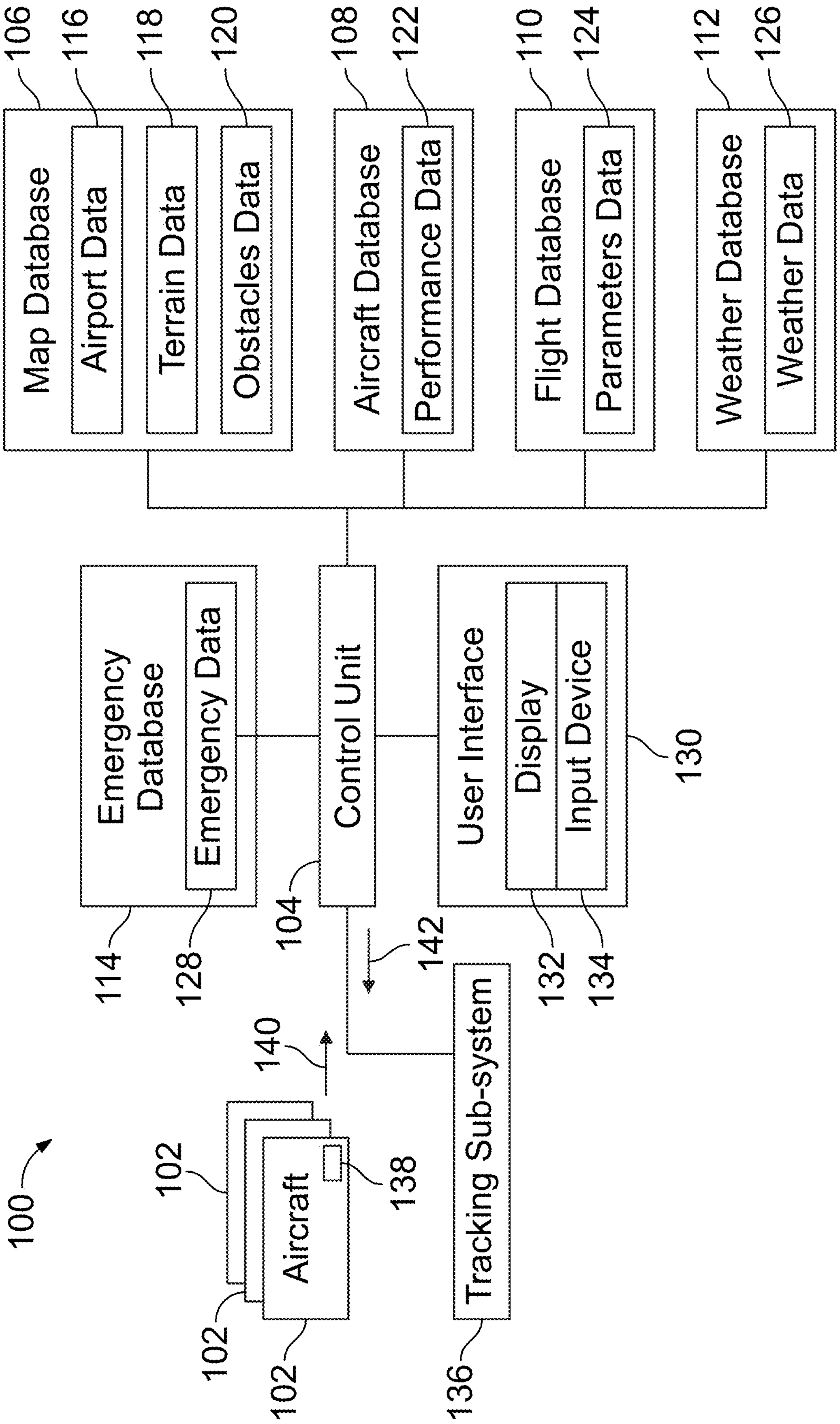
FIG. 1 illustrates a schematic block diagram of a system for determining emergency escape paths for aircraft, according to an example of the present disclosure.

FIG. 1 illustrates a schematic block diagram of a system 100 for determining emergency escape paths for aircraft 102, according to an example of the present disclosure. The system 100 includes a control unit 104 in communication with a map database 106, an aircraft database 108, a flight database 110, a weather database 112, and an emergency database 114, such as through one or more wired or wireless connections. The control unit 104 can also be in communication with other types of databases, such as a navigation database, a policy database, a regulation database, and/or the like. The control unit 104 can be co-located with one or more of the map database 106, the aircraft database 108, the flight database 110, the weather database 112, and/or the emergency database, such as within a computer workstation. As another example, the control unit 104 is remotely located from one or more of the map database 106, the aircraft database 108, the flight database 110, the weather database 112, and/or the emergency database 114.

The map database 106 stores airport data 116, terrain data 118, and obstacles data 120. The airport data 116 includes information for one or more airports, such as geospatial locations, runway locations and lengths, locations and capabilities of navigation aids and terrestrial points used for flight by instrument reference, and the like. The terrain data 118 includes information regarding features, altitudes, and the like of terrain, such as mountains, hills, rivers, lakes, and the like. The terrain is within an original flight path (that is, a predetermined flight plan before any emergency) of an aircraft 102, and/or a determined emergency escape path. The obstacles data 120 includes information regarding various obstacles, such as a building, bridges, roads, and the like. The obstacles are within an original flight path of an aircraft 102, and/or a determined emergency escape path.

In at least one example, the map database 106 also includes a navigation database. Optionally, the navigation database can be separate and distinct from the map database 106. In at least one example, the navigation database stores airways and navigation aids that can be incorporated into visual or emergency escape paths, for example.

The aircraft database 108 stores performance data 122 for various types of aircraft 102. The performance data 122 includes information related to the performance of the aircraft, such as maximum airspeed, weight, turning radii, and the like. The performance data 122 also includes performance capabilities of the aircraft 102 during emergencies (for example, any and all emergencies), such as when an engine is inoperable.

The flight database 110 stores parameters data 124 regarding flights of the aircraft 102. The parameters data 124 includes information regarding departure airports, times, takeoff rate and time, cruising altitude, descent rate and time, and the like.

The weather database 112 stores weather data 126. The weather data 126 includes information regarding various types of weather events and features.

Various other types of data can also be considered and analyzed, such as by the control unit 104. For example, the control unit 104 can receive and analyze navigation data, policy data, regulatory data, and/or the like.

The emergency database 114 includes emergency data 128 regarding various types of emergencies that can occur before and during a flight of the aircraft 102. For example, the emergency data 128 includes information regarding emergencies such as engine failure of the aircraft, sudden decompression above a safe altitude, and the like.

The control unit 104 is also in communication with a user interface 130, such as through one or more wired or wireless connections. The user interface 130 includes a display 132 and an input device 134. For example, the display 132 is an electronic monitor, television, and/or the like, and the input device 134 includes one or more of a keyboard, a mouse, a stylus, and/or the like. In at least one example, the display 132 and the input device 134 are integrated as a touchscreen interface. In at least one example, the user interface 130 is a computer workstation. As another example, the user interface 130 is a handheld device, such as a smartphone, smart tablet, or the like. In at least one example, the control unit 104 and the user interface 130 are at a common location, such as at a central monitoring location. As another example, the control unit 104 and the user interface 130 are remote from one another. In at least one example, an aircraft 102 can include the user interface 130, such as within an internal cabin.

A tracking sub-system 136 is configured to track positions of the aircraft 102. For example, the aircraft 102 include one or more position sensors 138 that are detected and tracked by the tracking sub-system 136. The tracking sub-system 136 can be a radar sub-system. As another example, the tracking sub-system 136 can be an automatic dependent surveillance-broadcast (ADS-B) sub-system.

The position sensor 138 can be an ADS-B transmitter configured to output an ADS-B OUT signal. The ADS-B OUT signal provides information regarding the aircraft 102 within an airspace. For example, the ADS-B OUT signal provides position, heading, speed, altitude, and the like for the aircraft 102. The tracking sub-system 136 is configured to receive the ADS-B OUT signals from the aircraft 102. For example, the tracking sub-system 136 includes an ADS-B receiver that is configured to receive the ADS-B OUT signals from the aircraft 102. In this example, the tracking sub-system 136 is an ADS-B tracking sub-system that determines a current position of an aircraft 102 via satellite navigation through a positional signal (that is, the ADS-B OUT signal) of the aircraft 102 output by the ADS-B transmitter. As another example, the tracking sub-system 136 can be a global positioning system. In at least one example, the control unit 104 is in communication with the tracking sub-system 136.

In operation, the control unit 104 automatically determines emergency escape paths for the aircraft 102 without human intervention. For example, the control unit 104 receives the emergency data 128 from the emergency database 114 and determines emergency escape paths for the aircraft 102 based on various types of additional data. For example, the control unit 104 determines emergency escape paths based on one or more of the airport data 116, the terrain data 118, the obstacles data 120, the performance data 122, the parameters data 124, and the weather data 126. In at least one example, the control unit 104 determines emergency escape paths for all types of emergencies, which are stored in the emergency data 128 within the emergency database 114.

In at least one example, the control unit 104 determines the emergency escape paths for all types of emergencies before an aircraft 102 is dispatched for a flight. In this manner, the control unit 104 predetermines the emergency escape paths before an aircraft 102 is scheduled for a flight. During a flight, if the aircraft 102 experiences an emergency (such as an engine failure or an unsafe decompression event), the control unit 104 receives an emergency signal 140 from the aircraft 102, such as through one or more communication devices, such as antennas, transceivers, and/or the like. The emergency signal 140 includes information indicating the specific emergency. The control unit 104 then automatically (without human intervention) compares the emergency being experienced by the aircraft 102. The control unit 104 further automatically (without human intervention) matches the emergency with specific emergency information within the emergency data 128, and then automatically (without human intervention) matches the emergency escape path for the particular emergency. The control unit 104 then outputs an escape path signal 142 to the aircraft 102 (such as through one or more communication devices, such as antennas, transceivers, and/or the like). The escape path signal 142 includes information regarding the emergency escape path to be flown in response to the emergency. The emergency escape path can be shown on the display 132, and/or a display within the aircraft 102. In at least one example, the aircraft 102 is automatically operated according to the emergency escape path in the signal received from the control unit 104. For example, the control unit 104 can automatically operate the controls of the aircraft 102 according to the emergency escape path. As another example, a flight computer or automatic pilot system of the aircraft 102 may automatically operate the aircraft 102 according to the emergency escape path. As another example, a flight crew operates the aircraft 102 according to the emergency escape path.

In at least one other example, the control unit 104 can determine and generate the emergency escape path in response to receiving the emergency signal 140 from the aircraft 102. That is, the control unit 104 can automatically determine the emergency escape path in real time, instead of predetermining the emergency escape path prior to the aircraft 102 being dispatched for a flight. In this example, the control unit 104 receives the emergency signal 140 indicating the emergency from the aircraft 102. In response to receiving the emergency signal 140, the control unit 104 matches the emergency being experienced by the aircraft 102 with the specific emergency stored in the emergency data 128 of the emergency database 114. Then, the control unit 104 automatically determines the emergency escape path for the emergency based on data, such as one or more of the airport data 116, the terrain data 118, the obstacles data 120, the performance data 122, the parameters data 124, the weather data 126, and/or the like. The control unit 104 then outputs the escape path signal 142, which includes the determined emergency escape path, to the aircraft 102. The aircraft 102 can be automatically operated based on the determined emergency escape path.

The control unit 104 automatically determines the emergency escape paths to comply with specified minimum performance requirements (such as stored in the performance data 122), which define a lower limit for flight safety. Such requirements include flight path clearance margins from terrain and obstructions during all flight phases. The control unit 104 is configured to automatically determine the emergency escape paths based on performance aspects of the aircraft 102, safety requirements (such as determined by one or more regulatory bodies, and which can be stored in the emergency data 128, for example), and operational capability for the planned flight (such as stored in the parameters data 124), including the effects of aircraft and system failures detailed in the requirements. In at least one example, the control unit 104 interacts with computational flight performance modules (such as stored in the performance data 122) and digital terrain (such as stored in the terrain data 118) and obstruction models (such as stored in the obstacles data 120) to automatically determine and generate optimized emergency escape paths, which can be sent to the aircraft 102 via the escape path signals 142.

In at least one example, the control unit 104 automatically optimizes the emergency escape path in relation to performance capabilities (such as stored in the performance data 122) of the aircraft 102. For example, the control unit 104 tailors the emergency escape path to various performance capabilities, such as turning ability, of the aircraft 102. The control unit 104 can automatically search for the optimal emergency escape path and a heaviest allowable takeoff weight (such as stored in the parameters data 124) at the conditions expected (such as stored in the weather data 126) during a flight. Preliminary studies comparing procedures generated by examples of the present disclosure and existing manual design process estimate as high as 25% of additional structural weight payload per flight from mountainous airports in conditions limited by terrain or obstructions. Additional takeoff payload represents value to an operator in terms of additional cargo, passengers, tanker fuel, or airlines can use the additional performance capability to reduce takeoff power settings for improvements in engine life and operational sustainability.

As described herein, examples of the present disclosure provide systems and methods that provide an alternative to manual determination of required flight paths. By eliminating this bottleneck, and replacing it with an automatic, flexible system and method, a higher volume of procedures can be efficiently and effectively generated. Higher volume can translate into lower cost of the service, improved procedure update tempo (keeping pace with the rate of changes in primary data sources, keeping pace with tempo expected by an operator, etc.), higher operational speed at dispatch in identifying the emergency procedure and validating performance/takeoff weight, and greater flexibility/customization (accommodating customer-specific policies).

The systems and methods described herein reduce the cost and time for flight path design, which also make the systems and methods useful in relation to unpiloted aircraft missions. The systems and methods are configured to react to aircraft, propulsion, or system failures in real-time (or near real-time), and determine an optimal emergency escape path that avoids hazards based on the performance available during an emergency.

Figure 2:
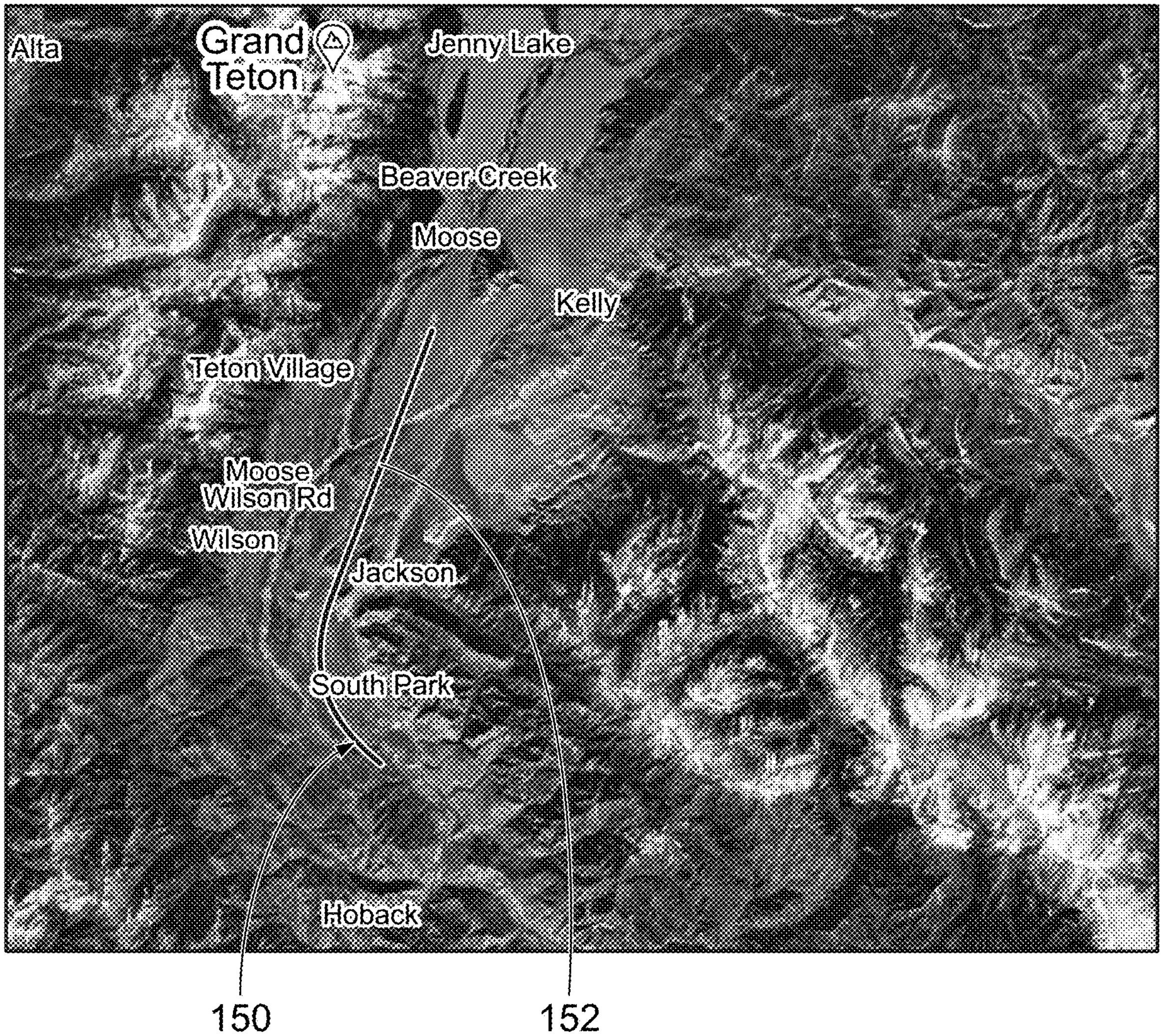
FIG. 2 illustrates a display showing an emergency escape path, according to an example of the present disclosure.

FIG. 2 illustrates a display 132 showing an emergency escape path 150, according to an example of the present disclosure. Referring to FIGS. 1 and 2, the control unit 104 determines the emergency escape path 150. The control unit 104 shows the emergency escape path 150 on the display 132, which can be within a flight deck or cockpit of an aircraft 102. In at least one example, the control unit 104 automatically and directly generates emergency escape paths based on specific sets of dispatch conditions and maximum operational benefit. As an example, for Jackson Hole airport (KJAC), the control unit 104 determines the emergency escape path 150 so that the aircraft 102 climbs within the valley 152 heading South.

In at least one example, the control unit 104 automatically determines the emergency escape path 150 based on terrain, obstacles, as well as aircraft performance to maximize operational benefit compliant with all applicable regulations. The dual optimization (factoring in terrain/obstacles, as well as aircraft performance) eliminates, minimizes, or otherwise reduces the limitations of prior manual processes, which attempted to determine flight paths based only on the terrain and obstruction environment, or relied on iterative processes involving manual labor by skilled subject matter experts.

The systems and methods described herein provide emergency escape paths that can be configured to optimize maximum takeoff weight for current weather conditions. The control unit 104 can also account for operator-specific policies and constraints as inputs.

As described, the control unit 104 is configured to automatically determine emergency escape paths for various types of emergencies during various phases of flight. Examples of the emergencies include engine failure during take-off, cruise, descent, or the like, unsafe decompression during cruise, and the like. Such are examples of emergencies. The control unit 104 can be configured to determine emergency escape paths for any and all emergencies that an aircraft may experience.

Figure 3:
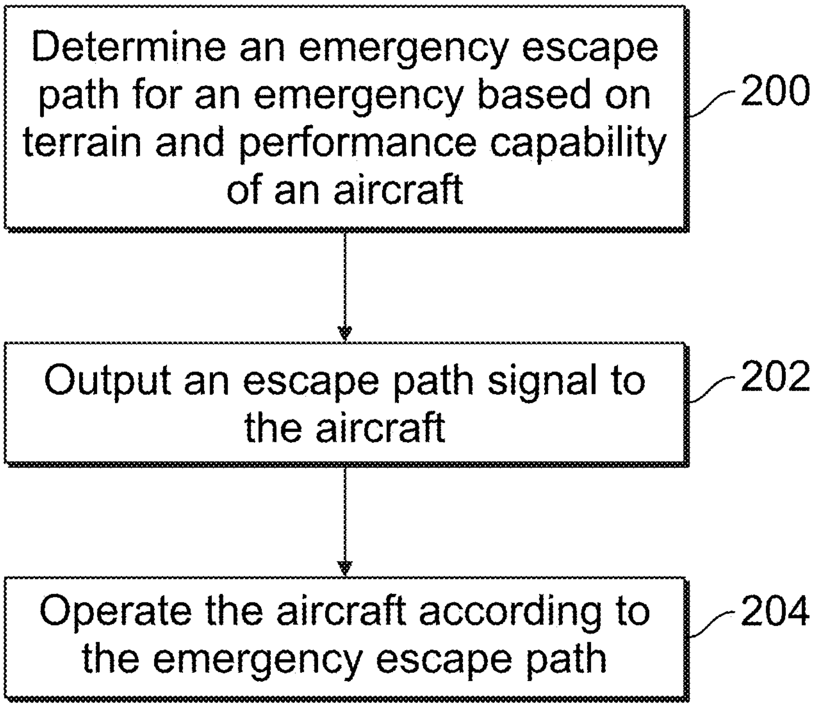
FIG. 3 illustrates a flow chart of a method, according to an example of the present disclosure.

FIG. 3 illustrates a flow chart of a method, according to an example of the present disclosure. Referring to FIGS. 1 and 3, at 200, the control unit 104 automatically determines one or more emergency escape paths for one or more emergencies, such as based on terrain (stored as terrain data 118), obstacles (stored as obstacles data 120), and performance capability (stored as performance data 122) of an aircraft 102. At 202, in response to receiving an emergency signal 140 from the aircraft 102, the control unit 104 outputs an escape path signal 142, which includes the determined emergency escape path, to the aircraft 102. At 204, the aircraft 102 is then operated (either manually or automatically) according to the emergency escape path.

Figure 4:
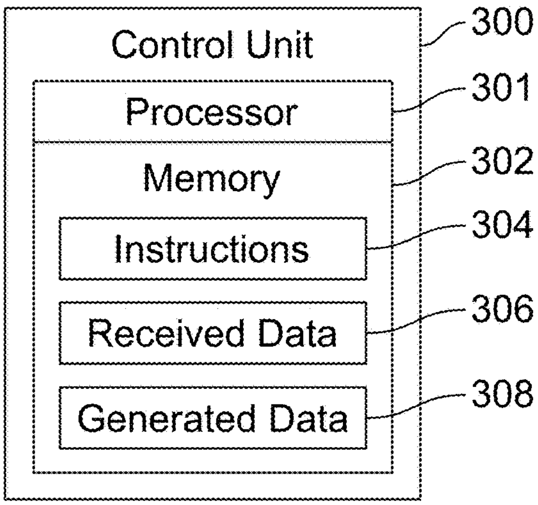
FIG. 4 illustrates a schematic block diagram of a control unit, according to an example of the present disclosure.

FIG. 4 illustrates a schematic block diagram of a control unit 300, according to an example of the present disclosure. The control unit 104 can be configured as the control unit 300. In at least one example, the control unit 300 includes at least one processor 301 in communication with a memory 302. The memory 302 stores instructions 304, received data 306, and generated data 308. The control unit 300 shown in FIG. 4 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 104 may be or include one or more processors that are configured to control operation, as described herein.

The control unit 104 is configured to execute a set of instructions that are stored in one or more data storage units or elements (such as one or more memories), in order to process data. For example, the control unit 104 may include or be coupled to one or more memories. The data storage units may also store data or other information as desired or needed. The data storage units may be in the form of an information source or a physical memory element within a processing machine.

The set of instructions may include various commands that instruct the control unit 104 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 104. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 104 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories, cloud-based applications, and/or the like) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Referring to FIGS. 1-4, examples of the subject disclosure provide systems and methods that allow large amounts of data to be quickly and efficiently analyzed by a computing device. For example, the control unit 104 can analyze various aspects of numerous aircraft 102, emergencies, terrain, obstacles, and the like during a particular time period. As such, large amounts of data, which may not be discernable by human beings, are being tracked and analyzed. The vast amounts of data are efficiently organized and/or analyzed by the control unit 104, as described herein. The control unit 104 analyzes the data in a relatively short time in order to quickly and efficiently determine emergency escape paths for emergencies for the aircraft 102. A human being would be incapable of efficiently analyzing such vast amounts of data in such a short time. As such, examples of the present disclosure provide increased and efficient functionality, and vastly superior performance in relation to a human being analyzing the vast amounts of data.

In at least one example, components of the system 100, such as the control unit 104, provide and/or enable a computer system to operate as a special computer system for automatically determining emergency escape paths for aircraft. The control unit 104 improves upon standard computing devices by determining such information in an efficient and effective manner.

In at least one example, all or part of the systems and methods described herein may be or otherwise include an artificial intelligence (AI) or machine-learning system that can automatically perform the operations of the methods also described herein. For example, the control unit 104 can be an artificial intelligence or machine learning system. These types of systems may be trained from outside information and/or self-trained to repeatedly improve the accuracy and efficiency with how data is analyzed to automatically determine emergency escape paths for aircraft 102. Over time, these systems can improve by determining such information with increasing accuracy and speed, thereby significantly reducing the likelihood of any potential errors. For example, the AI or machine-learning systems can learn and determine patterns and use them to automatically and efficiently determine the emergency escape paths therefrom. The AI or machine-learning systems described herein may include technologies enabled by adaptive predictive power and that exhibit at least some degree of autonomous learning to automate and/or enhance pattern detection (for example, recognizing irregularities or regularities in data), customization, and/or the like. The systems may be trained and re-trained using feedback from one or more prior analyses of the data, ensemble data, and/or other such data. Based on this feedback, the systems can be trained by adjusting one or more parameters used in the analysis of the same. This process can be performed using the data, and may be repeated many times to repeatedly improve the determination of emergency escape paths. The training minimizes conflicts and interference by performing an iterative training algorithm, in which the systems are retrained with an updated set of data (for example, data received before, during, and/or after each flight of the aircraft 102) and based on the feedback examined prior to the most recent training of the systems. This provides a robust analysis model that can better determine situational information in a cost effective and efficient manner.

Figure 5:
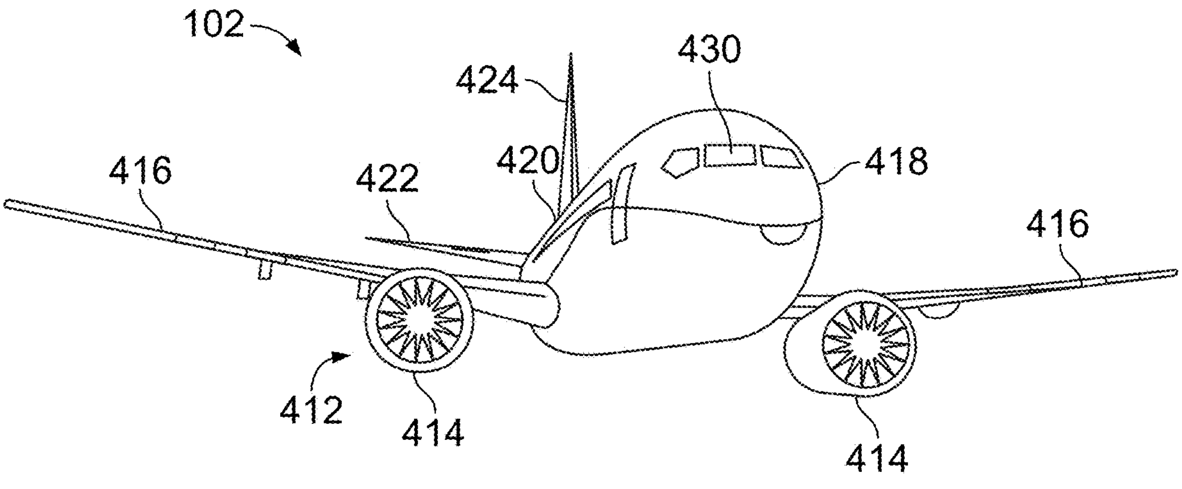
FIG. 5 illustrates a perspective front view of an aircraft, according to an example of the present disclosure.

FIG. 5 illustrates a perspective front view of an aircraft 102, according to an example of the present disclosure. The aircraft 102 includes a propulsion system 412 that includes engines 414, for example. Optionally, the propulsion system 412 may include more engines 414 than shown. The engines 414 are carried by wings 416 of the aircraft 102. In other examples, the engines 414 may be carried by a fuselage 418 and/or an empennage 420. The empennage 420 may also support horizontal stabilizers 422 and a vertical stabilizer 424. The fuselage 418 of the aircraft 102 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like. FIG. 5 shows an example of an aircraft 102. It is to be understood that the aircraft 102 can be sized, shaped, and configured differently than shown in FIG. 5.

Further, the disclosure comprises examples according to the following clauses:

Clause 1. A system for determining one or more emergency escape paths for one or more emergencies that can occur during a flight of an aircraft, the system comprising:
- a control unit configured to automatically determine the one or more emergency escape paths for the one or more emergencies based on performance capabilities of the aircraft, terrain within at least a portion of an original flight path or the one or more emergency escape paths, and obstacles within at least a portion of the original flight path or the one or more emergency escape paths.

Clause 2. The system of Clause 1, wherein the control unit is configured to automatically determine the one or more emergency escape paths based further on one or more airports.

Clause 3. The system of Clauses 1 or 2, wherein the control unit is configured to automatically determine the one or more emergency escape paths based further on parameters of one or more flights of the aircraft.

Clause 4. The system of any of Clauses 1-3, wherein the control unit is configured to automatically determine the one or more emergency escape paths based further on weather.

Clause 5. The system of any of Clauses 1-4, wherein the one or more emergencies comprise one or both of an engine failure, or an unsafe decompression.

Clause 6. The system of any of Clauses 1-5, further comprising a user interface in communication with the control unit, wherein the user interface comprises a display, and wherein the control unit is configured to show the one or more emergency escape paths on the display.

Clause 7. The system of any of Clauses 1-6, wherein the control unit is configured to automatically determine the one or more emergency escape paths before the aircraft is dispatched for a flight.

Clause 8. The system of any of Clauses 1-7, wherein the control unit is configured to automatically determine the one or more emergence escape paths in response to receiving an emergency signal indicating the one or more emergencies from the aircraft during a flight.

Clause 9. The system of any of Clauses 1-8, wherein the one or more emergencies comprise all types of emergencies that can occur during the flight.

Clause 10. The system of any of Clauses 1-9, wherein the aircraft is automatically operated according to the one or more emergency escape paths.

Clause 11. The system of any of Clauses 1-10, wherein control unit is an artificial intelligence or machine learning system.

Clause 12. A method for determining one or more emergency escape paths for one or more emergencies that can occur during a flight of an aircraft, the method comprising:
- automatically determining, by a control unit, the one or more emergency escape paths for the one or more emergencies based on performance capabilities of the aircraft, terrain within at least a portion of an original flight path or the one or more emergency escape paths, and obstacles within at least a portion of the original flight path or the one or more emergency escape paths.

Clause 13. The method of Clause 12, wherein said automatically determining further comprises automatically determining the one or more emergency escape paths based further on one or more airports, parameters of one or more flights of the aircraft, and weather.

Clause 14. The method of Clauses 12 or 13, further comprising showing the one or more emergency escape paths on a display of a user interface that in communication with the control unit.

Clause 15. The method of any of Clauses 12-14, wherein said automatically determining occurs before the aircraft is dispatched for a flight.

Clause 16. The method of any of Clauses 12-15, wherein said automatically determining occurs in response to receiving an emergency signal indicating the one or more emergencies from the aircraft during a flight.

Clause 17. The method of any of Clauses 12-16, wherein the one or more emergencies comprise all types of emergencies that can occur during the flight.

Clause 18. The method of any of Clauses 12-17, further comprising automatically operating the aircraft according to the one or more emergency escape paths.

Clause 19. The method of any of Clauses 12-18, wherein the control unit is an artificial intelligence or machine learning system.

Clause 20. A non-transitory computer-readable storage medium comprising executable instructions that, in response to execution, cause one or more control units comprising a processor, to perform operations comprising:

automatically determining one or more emergency escape paths for one or more emergencies based on performance capabilities of an aircraft, terrain within at least a portion of an original flight path or the one or more emergency escape paths, and obstacles within at least a portion of the original flight path or the one or more emergency escape paths.

As described herein, examples of the present disclosure provide systems and methods for efficiently and effectively determining emergency escape paths for various different types of flight emergencies, such as engine failures, decompression emergencies, and the like.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:

an aircraft configured to output an emergency signal indicative of an emergency that occurs during a flight; and a control unit configured to:

receive the emergency signal from the aircraft, and in response to receiving the emergency signal from the aircraft, automatically determine an emergency escape path for the emergency based on emergency data including information regarding the emergency, performance capabilities of the aircraft, terrain within at least a portion of an original flight path or the emergency escape path, and obstacles within at least a portion of the original flight path or the emergency escape path, wherein the automatically determine includes automatically matching the emergency with specific emergency information within the emergency data, and automatically matching the emergency escape path associated with the specific emergency information, wherein the control unit further automatically determines the emergency escape path to comply with specified minimum performance requirements, which define a lower limit for flight safety, wherein the specified minimum performance requirements include flight path clearance margins from terrain and obstructions during all flight phases, wherein the control unit further automatically determines the emergency escape path based on performance aspects of the aircraft, safety requirements, and operational capability for the flight, wherein the aircraft is configured to be operated according to the emergency escape path.

2. The system of claim 1, wherein the control unit is configured to automatically determine the emergency escape path based further on one or more airports.

3. The system of claim 1, wherein the control unit is configured to automatically determine the emergency escape path based further on parameters of the flight of the aircraft, and one or more flights of one or more other aircraft.

4. The system of claim 1, wherein the control unit is configured to automatically determine the emergency escape path based further on weather.

5. The system of claim 1, wherein the emergency comprises an engine failure, or an unsafe decompression.

6. The system of claim 1, further comprising a user interface in communication with the control unit, wherein the user interface comprises a display, and wherein the control unit is configured to show the emergency escape path on the display.

7. The system of claim 1, wherein the control unit is further configured to automatically determine the emergency escape path before the aircraft is scheduled for the flight.

8. The system of claim 1, wherein the emergency is any type of emergency that can occur during the flight.

9. The system of claim 1, wherein the aircraft is automatically operated according to the emergency escape path.

10. The system of claim 1, wherein the control unit is an artificial intelligence or machine learning system.

11. The system of claim 1, wherein the performance capabilities include maximum airspeed, weight, and turning radii, wherein the terrain includes mountains, hills, rivers, and bodies of water, and wherein the obstacles include buildings, bridges, and roads.

12. A method comprising:

outputting, by an aircraft, an emergency signal indicative of an emergency that occurs during a flight;

receiving, by a control unit, the emergency signal from the aircraft;

in response to said receiving the emergency signal from the aircraft, automatically determining, by the control unit, an emergency escape path for the emergency based on emergency data including information regarding the emergency, performance capabilities of the aircraft, terrain within at least a portion of an original flight path or the emergency escape path, and obstacles within at least a portion of the original flight path or the emergency escape path, wherein said automatically determining includes automatically matching the emergency with specific emergency information within the emergency data, and automatically matching the emergency escape path associated with the specific emergency information, wherein said automatically determining further comprises automatically determining the emergency escape path to comply with specified minimum performance requirements, which define a lower limit for flight safety, wherein the specified minimum performance requirements include flight path clearance margins from terrain and obstructions during all flight phases, and wherein said automatically determining further comprises automatically determining the emergency escape path based on performance aspects of the aircraft, safety requirements, and operational capability for the flight; and operating the aircraft according to the emergency escape path.

13. The method of claim 12, wherein said automatically determining further comprises automatically determining the emergency escape path based further on one or more airports, parameters of the flight of the aircraft and one or more flights of one or more other aircraft, and weather.

14. The method of claim 12, further comprising showing the emergency escape path on a display of a user interface that is in communication with the control unit.

15. The method of claim 12, wherein said automatically determining also occurs before the aircraft is scheduled for the flight.

16. The method of claim 12, wherein the emergency is any type of emergency that can occur during the flight.

17. The method of claim 12, wherein said operating the aircraft comprises automatically operating the aircraft according to the one or more emergency escape paths.

18. The method of claim 12, wherein the control unit is an artificial intelligence or machine learning system.

19. A non-transitory computer-readable storage medium comprising executable instructions that, in response to execution, cause one or more control units comprising a processor, to perform operations comprising:

receiving an emergency signal indicative of an emergency that occurs during a flight of an aircraft;

in response to said receiving the emergency signal, automatically determining one or more emergency escape paths for one or more emergencies based on emergency data including information regarding the emergency, performance capabilities of an aircraft, terrain within at least a portion of an original flight path or the one or more emergency escape paths, and obstacles within at least a portion of the original flight path or the one or more emergency escape paths, wherein said automatically determining includes automatically matching the emergency with specific emergency information within the emergency data, and automatically matching the emergency escape path associated with the specific emergency information, wherein said automatically determining further comprises automatically determining the emergency escape path to comply with specified minimum performance requirements, which define a lower limit for flight safety, wherein the specified minimum performance requirements include flight path clearance margins from terrain and obstructions during all flight phases, and wherein said automatically determining further comprises automatically determining the emergency escape path based on performance aspects of the aircraft, safety requirements, and operational capability for the flight; and operating the aircraft according to the emergency escape path.

20. The method of claim 12, wherein the performance capabilities include maximum airspeed, weight, and turning radii, wherein the terrain includes mountains, hills, rivers, and bodies of water, and wherein the obstacles include buildings, bridges, and roads.

* * * * *